No. 809,197. PATENTED JAN. 2, 1906.
G. W. LONG.
SELF FASTENING COTTON MARKER.
APPLICATION FILED JULY 11, 1905.

WITNESSES:
Samuel E. Grady
Geo. S. Brock

INVENTOR
George Washington Long.
BY Munn & Co.
ATTORNEYS

UNITED STATES PATENT OFFICE.

GEORGE WASHINGTON LONG, OF LINDSAY, INDIAN TERRITORY.

SELF-FASTENING COTTON-MARKER.

No. 809,197.     Specification of Letters Patent.     Patented Jan. 2, 1906.

Application filed July 11, 1905. Serial No. 269,200.

*To all whom it may concern:*

Be it known that I, GEORGE WASHINGTON LONG, a citizen of the United States, residing at Lindsay, District 17, Indian Territory, have invented a new and useful Improvement in Self-Fastening Cotton-Markers, of which the following is a specification.

My invention relates to improvements in cotton-markers, its object being to provide a device which shall be self-fastening and one which is simple, cheap, and efficient, one which is readily applied and which will remain in place when once attached to a bale of cotton, &c.

To these ends my invention consists of certain novel features of construction, arrangement, and combination of parts, as will be hereinafter fully described, and pointed out in the claims, reference being had to the accompanying drawings, in which—

Figure 1:
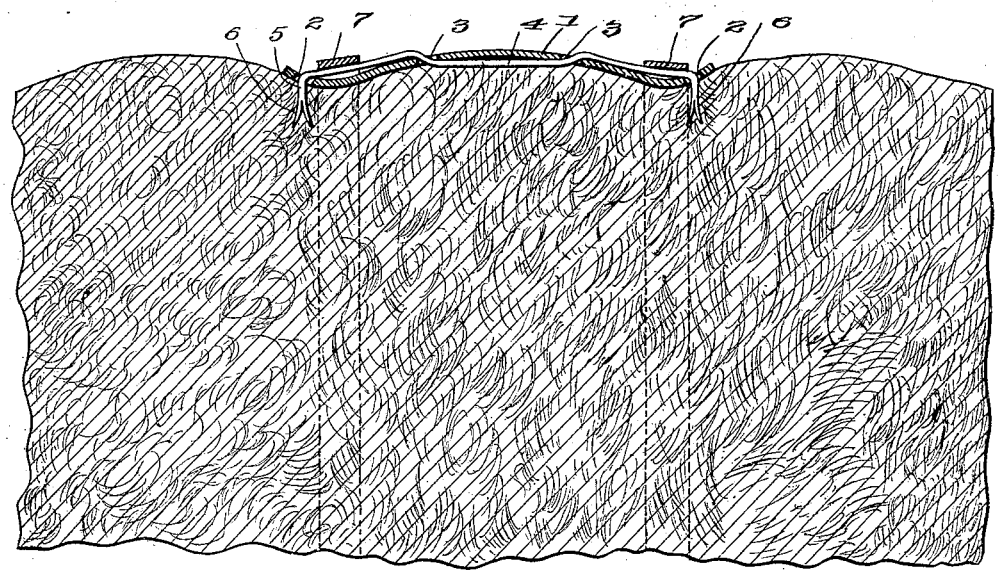
Figure 2:
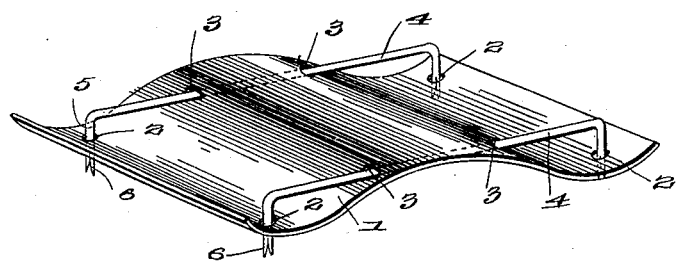
Figure 3:
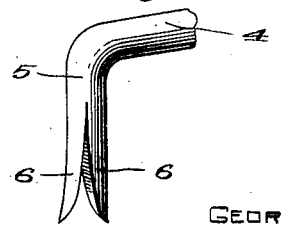

Figure 1 is a sectional view showing my improvement applied to a bale of cotton. Fig. 2 is a perspective view of the same before being applied to a bale. Fig. 3 is an enlarged detail of the end of the fastening rod or wire.

In carrying out my invention I use a single piece of sheet metal 1, upon which is suitably inscribed the desired marks or inscriptions. Said plate is provided at each corner with the perforations or holes 2 2 2 2, while intermediate its ends and along the edges I provide the perforations or holes 3 3 3 3.

4 4 are wires or rods threaded through the perforations 2 and 3 and bent inwardly at each end, as shown at 5. The ends of the inturned portions 5 are split, forming the pins 6 6, the said pins being spread slightly apart, as plainly shown in Figs. 2 and 3.

To apply my improved marker, it is placed against a bale of cotton with the pins 6 6 projecting inwardly, and pressure is then exerted against the outer face of the plate 1. The pins 6 6 are therefore forced into the fibers of the cotton composing the bale, and by virtue of the ends of the pins 6 6 being spread apart they fasten and hold in place the plate 1 and said plate will not drop off the bale accidentally. After the marker has been fastened to the bale the bale-ties 7 are passed around the bale and locked, said bale-ties passing over the plate 1 transversely near its ends, as shown on Fig. 1, thus forming an additional retaining device for the marker. It will be noticed that when the split ends 6 are forced into the bale the cotton will tend to further open or spread the said split ends, and thus form an additional detent against the accidental removal of the plate or in the event of the removal of the bale-ties which takes place when the bale is placed in the compress or the accidental breaking of one or both of the bale-ties.

As shown plainly in Fig. 2, the plate 1 is curved or corrugated, the central curved portion being provided with the perforations 3, through which the horizontal portions 4 of the wires or rods used to hold the marker to the bale are passed, while the split ends 6 of said wires or rods are passed through the perforations 2, which are located near each corner of the plate. These perforations are located near the edges of the plate, which are curved upwardly, as shown. Now these curvatures of the plate give it more or less spring or elasticity, causing the wires or rods to bend and be prevented from slipping. The ends 6 of the wires or rods being smooth readily enter the cotton as soon as pressure is put on the same, and the marker becomes fast to the bale entirely by the pressure put upon it by the compress at the same time the bale is made.

Having thus described my invention, what I claim as new, and desire to secure by Letters Patent, is—

1. A marker for cotton-bales and the like, consisting of a sheet-metal plate having perforations near each corner, and perforations intermediate said end perforations, smooth wires or rods threaded through said intermediate perforations, and bent downwardly passing through the end perforations, the ends of said rods having V-shaped slits, whereby when pressure is exerted on the bale during compression, the split ends of the rods or wires will be forced into the bale and spread apart, to retain the plate on the bale.

2. A marker for cotton-bales and the like, comprising a curved sheet-metal plate having an arched central portion and provided with perforations at the sides of said arched portion, said plate being further provided with perforations near each corner and in longitudinal alinement with the perforations at the sides of the arched portion, and rods or wires threaded through the perforations of the arched portion and having their ends bent downwardly through the end perforations, the extreme ends of said rods or wires having V-shaped slits, whereby the ends of said rods will be caused to spread apart by pressure during compression of the bale and secure the marker to the bale.

3. A marker for cotton-bales and the like, comprising a sheet-metal plate having parallel rows of perforations, and smooth rods or wires threaded through said perforations, the ends of the rods being bent downwardly and provided with V-shaped slits, whereby the slitted ends of the rods or wires will be caused to spread apart by pressure during compression of the bale, and thereby secure the plate to the bale.

GEORGE WASHINGTON LONG.

Witnesses:
 JNO. W. CURLEY,
 CHAS. L. GRIMES.